United States Patent
Choi et al.

(10) Patent No.: US 9,146,421 B2
(45) Date of Patent: Sep. 29, 2015

(54) LIQUID CRYSTAL DISPLAY

(75) Inventors: Hyunsic Choi, Beijing (CN); Hui Li, Beijing (CN); Zhiqiang Xu, Beijing (CN); Jung Mok Jun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 13/698,473

(22) PCT Filed: Sep. 13, 2012

(86) PCT No.: PCT/CN2012/081362
§ 371 (c)(1),
(2), (4) Date: Nov. 16, 2012

(87) PCT Pub. No.: WO2013/056607
PCT Pub. Date: Apr. 25, 2013

(65) Prior Publication Data
US 2013/0194530 A1      Aug. 1, 2013

(30) Foreign Application Priority Data

Oct. 20, 2011 (CN) ........................ 2011 2 0403039 U

(51) Int. Cl.
*G02F 1/1337*      (2006.01)
*G02F 1/13363*     (2006.01)
(Continued)

(52) U.S. Cl.
CPC .......... *G02F 1/13363* (2013.01); *G02B 5/3016* (2013.01); *G02B 5/3083* (2013.01); *G02F 1/133723* (2013.01); *G02F 1/134363* (2013.01); *G02F 2001/133565* (2013.01); *G02F 2001/133633* (2013.01); *G02F 2001/133738* (2013.01)

(58) Field of Classification Search
USPC .................................................. 349/117, 126
See application file for complete search history.

(56) References Cited

U.S. PATENT DOCUMENTS 5,926,241 A * 7/1999 Gunning, III ................. 349/117
6,540,940 B1    4/2003 Negoro et al.
(Continued)

FOREIGN PATENT DOCUMENTS

CN    100370340 C     2/2008
GB    2 394 718 A      5/2004
(Continued)

OTHER PUBLICATIONS

KIPO Office Action dated Oct. 31, 2013; Appln. No. 10-2012-7030808.
(Continued)

*Primary Examiner* — Lucy Chien
(74) *Attorney, Agent, or Firm* — Ladas & Parry LLP

(57) ABSTRACT

An embodiment of the present invention relates to a liquid crystal display. An upper surface alignment layer in the liquid crystal display is arranged to comprise, in the direction from a color filter substrate to a liquid crystal layer, a first upper surface alignment layer, a color washout compensation film layer and a second upper surface alignment layer; an alignment direction of the color washout compensation film layer is opposite to the pre-alignment direction of the liquid crystal layer. In the technical solution, the color washout compensation film layer is used to rectify the color washout problem occurring when the screen of a liquid crystal display screen of a fringe field switching mode is viewed from both the left side and right sides.

14 Claims, 2 Drawing Sheets

(51) Int. Cl.
*G02B 5/30* (2006.01)
*G02F 1/1343* (2006.01)
*G02F 1/1335* (2006.01)

(56) References Cited

U.S. PATENT DOCUMENTS

| 6,778,242 B1 * | 8/2004 | Murayama et al. ........... 349/117 |
| 2005/0140880 A1 | 6/2005 | Lee et al. |
| 2006/0193999 A1 | 8/2006 | Verall et al. |

FOREIGN PATENT DOCUMENTS

| JP | 07-104284 A | 4/1995 |
| JP | 2000-154261 A | 6/2000 |
| JP | 2005-258046 A | 9/2005 |
| JP | 2007-212960 A | 8/2007 |
| KR | 20040022179 A | 3/2004 |
| KR | 20060003341 A | 1/2006 |

OTHER PUBLICATIONS

Hee-Kyu Lee, et al; "Reactive Mesogen Mixtures for Integrated Optical Films", International Meeting on Information Display (IMID 2003) Digest, Daegu, Korea, Jul. 9-11, 2003; pp. 266-269.
International Search Report dated Dec. 20, 2012; PCT/CN2012/081362.
International Preliminary Report on Patentability Issued Apr. 22, 2014 Appln. No. PCT/CN2012/081362.
Korean Office Action dated May 30, 2014; Appln. No. 10-2012-7030808.
Extended European Search Report dated Jun. 25, 2014; Appln. No. 12778027.8-1904/2605061; PCT/CN2012081362.
Korean Office Action dated Mar. 2, 2015; Appln. No. 10-2012-7030808.
Korean Notice of Allowance dated Jul. 29, 2015; Appln. No. 10-2012-7030808.

* cited by examiner

LIQUID CRYSTAL DISPLAY

CROSS REFERENCE TO RELATED APPLICATIONS

This application is a national stage application under 35 U.S.C. 371 and claims the benefit of PCT Application No. PCT/CN2012/081362 having an international filing date of Sep. 13, 2012, which designated the United States, which PCT application claimed the benefit of Chinese Application No. 201120403039.X filed Oct. 20, 2011, the disclosure of both the above-identified applications are incorporated herein by reference.

TECHNICAL FILED

An embodiment of the present invention relates to a liquid crystal display

BACKGROUND

For liquid crystal displays of fringe field switching (FFS) mode, color washout of the displayed image occurs when the displays are viewed from both the left and right sides. The reason is that when an alignment film is subject to a rubbing process to achieve orientation during the fabrication of a liquid crystal display, the rubbing process is commonly performed in the direction opposite to the gate-pads (e.g., from left to right), and therefore, after the liquid crystal is filled into the resultant liquid crystal cell, the liquid crystal has a pre-tilt angle in the opposite direction to the gate-pads (to the right direction). Hence, as shown in FIG. 1, when the liquid crystal display (LCD) screen is viewed from the right side, a comparatively large phase difference will cause a yellowish viewing effect; but when the LCD screen is viewed from the left side, a comparatively little phase difference will result in a bluish viewing effect.

Presently, a method for rectifying the color washout effect occurred for viewing of an LCD screen from both the left and right sides is to use a polarizer sheet and a color washout compensation film. Specifically, a combination of a polarizer sheet and a c-plate is used to compensate the color washout in the up-down direction, the left-right direction, and the diagonal directions and to compensate the brightness value at low gray scale. But, this technical solution increases not only costs but also the thickness of the polarizer sheet. Further, although an all-direction compensation for the color washout phenomenon can be achieved, the optical design procedure thereof is very complicated and thus is not comparable with mass applications.

SUMMARY

The technical problems to be solved by the embodiments of the present invention are related to how to eliminate of the color washout effect of a liquid crystal display of a fringe field switching mode, control production costs, and simplify design.

An embodiment of the present invention provides a liquid crystal display, comprising: a color filter substrate, an array substrate and a liquid crystal layer disposed between the color filter substrate and the array substrate. An upper surface alignment layer is disposed between the color filter substrate and the liquid crystal layer, and a lower surface alignment layer is disposed between the array substrate and the liquid crystal layer. The upper surface alignment layer includes a first upper surface alignment layer, color washout compensation film layer and a second upper surface alignment layer sequentially in the direction from the color filter substrate to liquid crystal layer. An alignment direction of the color washout compensation film layer is opposite to a pre-alignment direction of the liquid crystal layer.

For example, a material of the color washout compensation film layer is selected from reactive mezogens.

For example, a rubbing direction of the first upper surface alignment layer is the same as a rubbing direction of the lower surface alignment layer.

For example, a rubbing direction for the color washout compensation film layer is the same as that of the lower surface alignment layer.

For example, a rubbing direction of the second upper surface alignment layer is opposite to that of the lower surface alignment layer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The present invention will be further described in detail with reference to the following drawings and embodiments.

To eliminate the color washout phenomenon of a liquid crystal display of the fringe field switching mode occurred when the display is watched from both the left and right sides, and control manufacturing costs and simplify design, in an embodiment of the present invention a method of using a color washout compensation film is employed to decrease the phase difference.

The material for the color washout compensation film layer selects a reactive mezogen (RM). The RM material is also referred as reactive liquid crystal. Reactive liquid crystal has a liquid crystal core and one or more reactive functional groups at ends thereof, which reactive groups are usually acrylate groups, and can be photo-polymerized into a polymer network. Because a polymerization initiator to be used is often of a UV-reactive type (the corresponding wavelength is from 254 to 365 nm), the reactive liquid crystal is also called as a UV-reactive liquid crystal. The current suppliers and products of UV-reactive liquid crystal include RM series by Merck, SLM series by Wacker, and Paliocolor series by BASF and so on. Also, the examples of RM materials can be found in Reactive Mesogen Mixtures for Integrated Optical Films, Lee et al, 2003 IMID, for example.

Like common liquid crystal, RM materials have phase difference, and can be cured upon ultraviolet irradiation and then become an optical layer having a certain phase difference. Therefore, when a color washout compensation film of an RM material is added in a liquid crystal display in a specific manner, the phase difference of the liquid crystal can be reduced, and the color washout problem of the screen of a liquid crystal display of the fringe field switching mode, which occurs when the display is watched from both the left and right sides, can be rectified.

Figure 1:
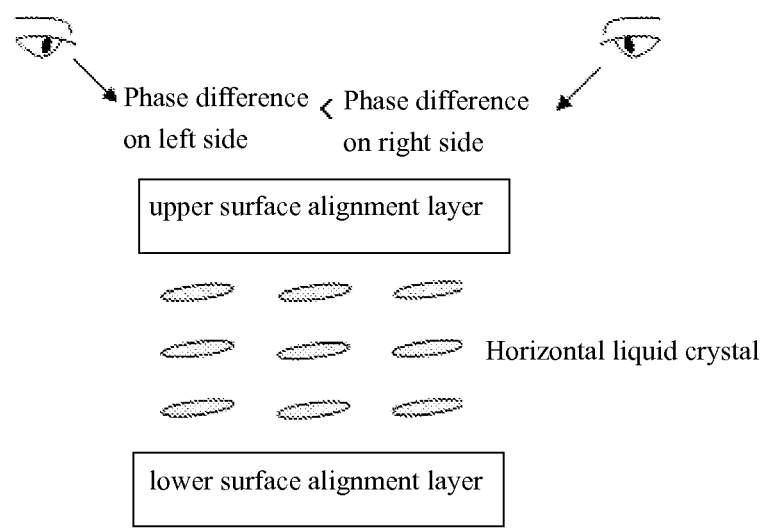
FIG. 1 is a schematic view of the color washout phenomenon occurred in a liquid crystal display in prior art, wherein the phase difference when the screen of the liquid crystal display is watched from the right side is greater than the phase difference when watched from the left side.
Figure 2A:
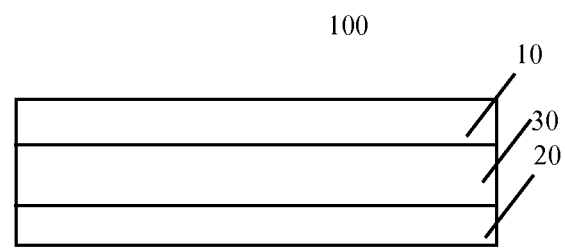
FIG. 2A-2B is a structural schematic view of a liquid crystal display according to a specific embodiment.

In detail, the liquid crystal display 100 of the fringe field switching mode is provided in the embodiment of the present invention, that is, the display 100 is, for example, an FFS type liquid crystal display. As shown in FIG. 2, the liquid crystal display 100 comprises a color filter substrate 10, an array substrate 20 and a liquid crystal layer 30 disposed between the color filter substrate and the array substrate. An upper surface alignment layer 40 is arranged between the color filter substrate 10 and the liquid crystal layer 30, and a lower surface alignment layer 50 is provided between the array substrate 20 and the liquid crystal layer 30.

In another example, the LCD 100 is for example an advanced super multiple field (ADS) type liquid crystal display and also a color filter substrate 10, an array substrate 20 and a liquid crystal layer 30 disposed between the color filter substrate and the array substrate. An upper surface alignment layer 40 is arranged between the color filter substrate 10 and the liquid crystal layer 30, and a lower surface alignment layer 50 is provided between the array substrate 20 and the liquid crystal layer 30.

Figure 2B:
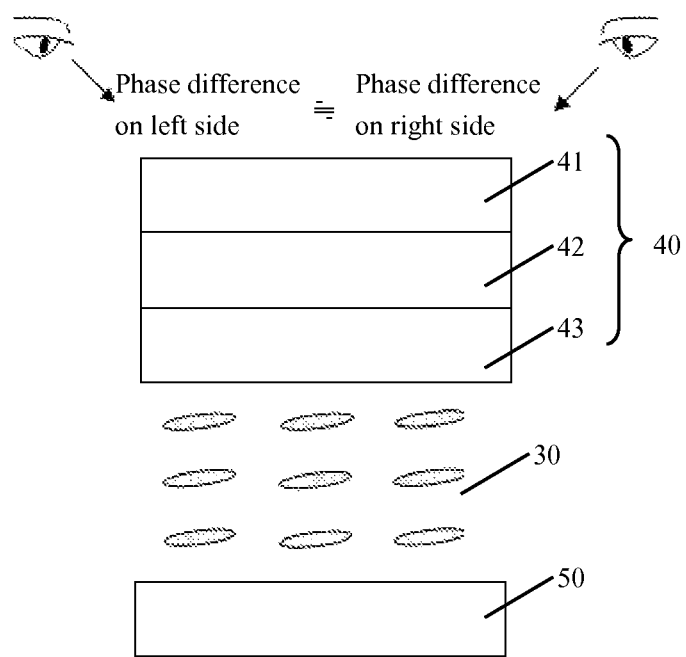

The upper and lower surface alignment layers are for example, polyimide (PI) layers, and are formed with fine grooves having a certain orientation on the surfaces thereof by a rubbing process, which are used for the pre-orientation of the liquid crystal. FIG. 2B is an enlarged schematic view of the upper surface alignment layer 40, the liquid crystal layer 30 as well as the lower surface alignment layer 50.

The upper surface alignment layer 40 includes a first upper surface alignment layer 41, a color washout compensation film layer 42, and a second upper surface alignment layer 43 sequentially in the direction from the color filter substrate 10 to the liquid crystal layer 30.

The color washout compensation film layer 42 is prepared with a cured RM material. The RM material has the properties of common liquid crystal and further has a certain phase difference after being cured.

The rubbing direction for the first upper surface alignment layer 41 is set to be same as the rubbing direction for the lower surface alignment layer 50. The rubbing direction for the first upper surface alignment layer 41 is used for the orientation of the RM material.

The rubbing direction for the color washout compensation film layer 42 is set to be same as that for the lower surface alignment layer 50.

The rubbing direction for the second upper surface alignment layer 42 is set to be opposite to that for the lower surface alignment layer 50.

In this way, the liquid crystal display employing the above mentioned structure can have the phase difference occurred at the right side substantially equal to the phase difference occurred at the left side, that is, the problem, that the phase differences occur on both the left and right sides for the liquid crystal displays in prior art and therefore gives rise to the color washout phenomenon, is eliminated.

One example of the formation process of the first upper surface alignment layer is as follows. Firstly, the first upper surface alignment layer 41 is formed onto the internal surface of the color filter substrate 10, and is subject to an alignment process, that is, rubbed in the same direction as the rubbing direction of the lower surface alignment layer 50 on the array substrate 20. At this time, as shown in FIG. 2B, assuming that the rubbing direction of the lower surface alignment layer 50 is towards the left, the rubbing direction of the horizontal first upper surface alignment layer 41 also towards the left. Then, the color washout compensation film layer 42 is formed on the first upper surface alignment layer 41, that is, an RM material is coated thereon, and then the color washout compensation film layer 42 is subject to an alignment process according to the alignment property of the first upper surface alignment layer 41, i.e., the rubbing direction of the RM color washout compensation film layer 42 is the same as the rubbing direction of the lower surface alignment layer 50 on the array substrate 20; next, after the RM color washout compensation film layer is cured through the UV radiation, on the color washout compensation film layer is formed the second upper surface alignment layer 43; the second upper surface alignment layer 43 is subject to an alignment process, being rubbed in the direction opposite to the rubbing direction of the lower surface alignment layer 50 on the array substrate, i.e., the rubbing process is performed in the right direction, so that an anti-parallel rubbing configuration is formed for early stage orientation in a liquid crystal display of a fringe field switching mode. In this configuration, the alignment direction of the RM material is opposite to the pre-alignment direction of the liquid crystal. In the other embodiment, the alignment direction of the RM material is opposite to and symmetrical with the pre-alignment direction of the liquid crystal.

Here, when the color washout compensation film layer 42 of the RM material is rubbed in the direction opposite to the lower surface alignment layer 50 on the array substrate 20, even greater phase difference will occur on the whole liquid crystal display; therefore, the rubbing direction thereof has to be the same as that of the lower surface alignment layer 50 on the array substrate 20.

Here, the alignment direction of the color washout compensation film layer 42 of the RM material is opposite to that of the liquid crystal, and therefore an effect of mutual phase compensation can be achieved; and if the alignment direction of the color washout compensation film layer 42 of the RM material is opposite to and symmetrical with the liquid crystal, an even better effect of mutual phase compensation can be achieved. In this way, when the liquid crystal display screen is watched from both the left and right sides, the phase difference produced in the liquid crystal display can be decreased, and the yellowish effect or bluish effect can be rectified.

In another example, the first upper alignment layer 41 may also be formed with UV polarizer material, and therefore the rubbing process for the first upper alignment layer 41 may become unnecessary.

In summary, compared with the prior art, the embodiment of the present invention has the features as follows:

(1) By making the alignment direction of the color washout compensation film layer prepared with an RM material to be opposite to or further symmetrical with the pre-alignment direction of liquid crystal, an effect of mutual phase compensation between the color washout compensation film layer and liquid crystal layer can be achieved. In this way, the phase difference occurred at both the left and right sides of the liquid crystal display screen will decrease, then the yellowish effect or bluish view effect can be rectified, and in turn the color washout problem presented when watching the LCD screen employing the Fringe Field Switching mode from both the left and right sides can be addressed effectively.

(2) This technical solution has fewer factors that increase costs and has a simple optical design, and can be easily applied in practice. In prior art, the method of adding a color washout compensation film onto a polarizer sheet has a drawback of increasing thickness of the polarizer sheet, however the embodiment of the present invention incurs no change the thickness thereof; therefore, the embodiment is helpful for the ultra-thin products of the fringe field switching mode, such as television, display and the like.

The above described is just a preferred embodiments of the present invention, it should be noted various modification and alternation can be made for the ordinary skilled in the art without departing from the principle of the invention, which should be regarded as the protection scope of the invention.

The invention claimed is:

1. A liquid crystal display comprising: a color filter substrate, an array substrate and a liquid crystal layer provided between the color filter substrate and the array substrate,
    wherein an upper surface alignment layer is disposed between the color filter substrate and the liquid crystal layer, and a lower surface alignment layer is disposed between the array substrate and the liquid crystal layer, and
    wherein the upper surface alignment layer comprises, sequentially in a direction from the color filter substrate to the liquid crystal layer, a first upper surface alignment layer, a color washout compensation film layer, and a second upper surface alignment layer, and an alignment direction of the color washout compensation film layer is opposite to a pre-alignment direction of the liquid crystal layer.

2. The liquid crystal display according to claim 1, wherein a material of the color washout compensation film layer is selected from reactive mezogens.

3. The liquid crystal display according to claim 1, wherein a rubbing direction of the first upper surface alignment layer is the same as that of the lower surface alignment layer.

4. The liquid crystal display according to claim 1, wherein a rubbing direction of the color washout compensation film layer is the same as that of the lower surface alignment layer.

5. The liquid crystal display according to claim 1, wherein a rubbing direction of the second upper surface alignment layer is opposite to that of the lower surface alignment layer.

6. The liquid crystal display according to claim 1, wherein the first upper surface alignment layer is formed of polyimide or a UV polarizer material.

7. The liquid crystal display according to claim 2, wherein a rubbing direction of the first upper surface alignment layer is the same as that of the lower surface alignment layer.

8. The liquid crystal display according to claim 2, wherein a rubbing direction of the color washout compensation film layer is the same as that of the lower surface alignment layer.

9. The liquid crystal display according to claim 3, wherein a rubbing direction of the color washout compensation film layer is the same as that of the lower surface alignment layer.

10. The liquid crystal display according to claim 2, wherein a rubbing direction of the second upper surface alignment layer is opposite to that of the lower surface alignment layer.

11. The liquid crystal display according to claim 3, wherein a rubbing direction of the second upper surface alignment layer is opposite to that of the lower surface alignment layer.

12. The liquid crystal display according to claim 2, wherein the first upper surface alignment layer is formed of polyimide or a UV polarizer material.

13. The liquid crystal display according to claim 3, wherein the first upper surface alignment layer is formed of polyimide or a UV polarizer material.

14. The liquid crystal display according to claim 1, wherein the second upper surface alignment layer contacts with the liquid crystal layer.

* * * * *